No. 609,029. Patented Aug. 16, 1898.
W. E. KARNS.
FORMING DIE.
(Application filed Sept. 2, 1897.)

(No Model.)

Witnesses
J. Grant Culverwell,

Inventor
William E. Karns.
By his Attorneys,
C. A. Snow & Co.

UNITED STATES PATENT OFFICE.

WILLIAM E. KARNS, OF PARKER'S LANDING, PENNSYLVANIA.

FORMING-DIE.

SPECIFICATION forming part of Letters Patent No. 609,029, dated August 16, 1898.

Application filed September 2, 1897. Serial No. 650,334. (No model.)

*To all whom it may concern:*

Be it known that I, WILLIAM E. KARNS, a citizen of the United States, residing at Parker's Landing, in the county of Armstrong and State of Pennsylvania, have invented certain new and useful Improvements in Forming-Dies, of which the following is a specification.

My invention relates to forming-dies, and has for its object to provide a relative construction of forming-dies adapted for molding plastic materials, such as rubber, and particularly adapted for use in the construction of packing-rings for pump-pistons of the class shown and described in a patent granted to me on June 23, 1896, No. 562,540, wherein the plastic material is molded to form the body or stiffener for supporting the webbing, as canvas or equivalent fabric, in operating position.

The special object of my invention is to provide a relative construction of die members, whereby the packing-rings formed therein are thickened and strengthened at the line of greatest wear, and hence made more durable.

Further objects and advantages of this invention will appear in the following description, and the novel features thereof will be particularly pointed out in the appended claim.

Figure 1:
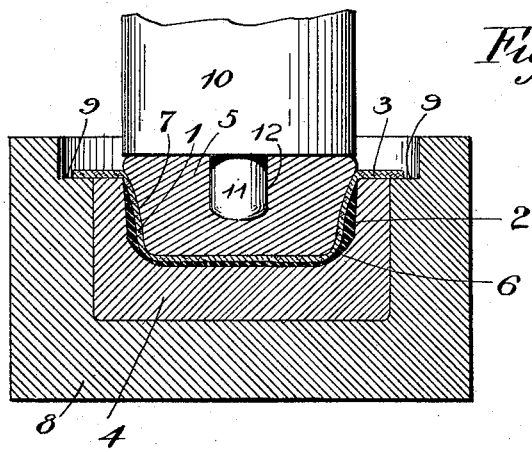
Figure 2:
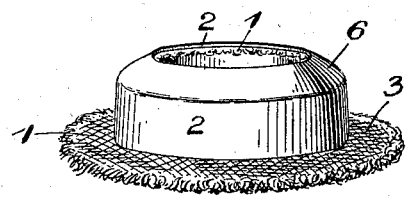
Figure 3:
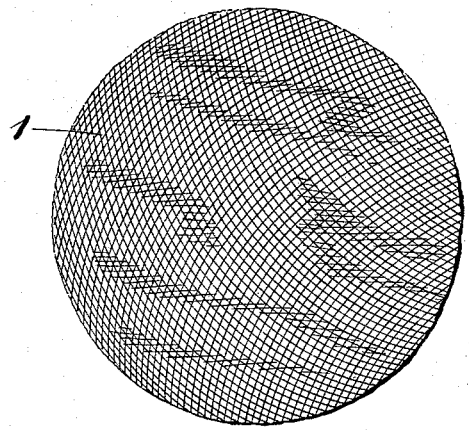

In the drawings, Figure 1 is a vertical sectional view of a die constructed in accordance with my invention, a packing-ring being shown interposed between the die members, as in the process of forming the same. Fig. 2 is a detail view of a completed packing-ring formed by means of the die embodying my invention. Fig. 3 is a plan view of the blank of fabric before its application to the die.

Similar numerals of reference indicate corresponding parts in all the figures of the drawings.

The die embodying my invention is especially designed for use in the construction of annular articles of plastic material, and particularly when, by reason of the proposed use of the completed article, it is necessary to subject the same during the forming operation to a severe pressure, such as that obtainable by means of a hydraulic press. The article for which the improved die was particularly designed consists of a ring of webbing 1, such as canvas or the equivalent thereof, and a stiffened body portion 2, of rubber, and in order that the members of the ring may be efficiently united it is necessary to compress the same under such conditions as will cause the rubber to penetrate the interstices or meshes of the fabric. Furthermore, in order that the article of manufacture as completed may be capable of performing efficiently the function for which it is designed it is necessary that a fringe or rim of the fabric shall project beyond that portion which is stiffened by means of the plastic material and that the body or ring portion should be thickened at an intermediate point and reduced upwardly and downwardly approximately to the thickness of the webbing. This rim is shown at 3, and it is necessary that the same shall be entirely free from any contact with the plastic material in order that it may be sufficiently flexible to perform the desired function. Also the annular side wall of the packing-ring, starting from the thickness of the rim 3, must increase in thickness toward the lower edge of the wall and then decrease again to form the floor of the ring, which is of a thickness approximately equal to or only slightly exceeding that of the webbing.

The female die member 4 consists of a cup of which the cavity has a cylindrical wall to suit that of the proposed article, and in co-operation with this female die is a male die 5, of which the construction is such as to compress the plastic material and fabric between its peripheral surface and the side wall of the cup, and thus insure the penetration of the fabric by the plastic material without allowing the latter to be forced between the upper portion of the peripheral surface of the male die and the upper edge of the cup and at the same time to thicken or bulge the wall of the article, as above indicated.

In the construction illustrated the packing-ring is provided at the edge opposite to the flexible rim 3 with an inturned stiffened flange 6, and in order to produce this construction the cavity in the female die is rounded at the junction of its cylindrical side wall with its flat bottom; but it is obvious that the forcible contact of the lower face of the male die with the contents of the cup (the downward movement of said male die not being limited) would result in forcing the plastic material out of its path, and thus interfere with the formation of the said necessary inturned flange 6. Hence it is necessary also to provide means for limiting the downward movement of the male die.

I accomplish the above-named objects—namely, the prevention of the escape of plastic material from the female die (and the consequent filling of the projecting portion of the fabric with plastic material) and the excessive movement of the male die within the female die—by flaring the peripheral or side wall of the male die toward its upper surface to form an overhanging or cam surface 7, which in the plane of the upper surface of the male die is approximately equal in diameter with the female die at the upper edge of its side wall. Hence when the fabric has been placed within the female die with a desired amount of plastic material the insertion of the male die causes the plastic material to spread uniformly over the inner surface of the female die; but as the former is depressed its flared or cam-shaped peripheral surface, which consists of a peripheral bulge flush with the upper surface of the die member, presses the fabric firmly against the upper edge of the female die, said pressure increasing as the depression of the male die proceeds, and thus prevents the escape of the plastic material. In other words, the flared or cam-shaped surface of the male die, in coöperation with the upper edge of the female die, bites the fabric, which thus forms a packing to prevent the escape of the contents of the cup, while the compressibility of the fabric allows sufficient pressure to be applied to the contents of the cup to accomplish the object.

As shown in Fig. 3, the fabric as applied to the die is in the form of a disk, and hence when the article is removed from the die it is provided with a closed center, which must subsequently be removed to form an opening of the desired diameter. Said center may be removed by any suitable cutting apparatus or the equivalent thereof.

The important feature of the construction resides in the peripheral flaring or bulging of the male die toward its upper surface to such a diameter as to fit snugly in the mouth of the female die, and thus prevent the escape of the plastic material, said male die being downwardly or inwardly tapered from the bulge to recede from the cylindrical wall of the female die member, and thus accommodate an increased amount of plastic material near the inwardly-rounded portion of the floor of the female member. Beyond this wide point of separation of the faces of the die members the interval is reduced to a little more than the thickness of the webbing to form the bottom of the packing-ring or the inturned flange 6. Thus the main portion of the wall of the female die member is parallel with the axis of the die, and hence the downward or inward tapering of the sides of the male die member causes the thickening of the resulting packing-ring from its outer edge toward its inner edge, as clearly shown in Fig. 1, a larger proportion of the plastic material being formed around the fabric contiguous to the plane of the inturned flange 6 and below which there is an abrupt reduction to the thickness of the flange 6.

In practice the female die is preferably fitted in a seat 8, having a rabbet 9, of which the horizontal side is flush with the upper edge of the cup to allow the projecting rim or fringe of the fabric to lie horizontally during the forming operation, and in order to insure the proper centering of the male die in the female die I preferably provide the plunger of the press, such a plunger being indicated at 10, with a central guide-pin 11, which extends downwardly into an opening or socket 12 in the male die member.

It will be understood that the male die member must be so proportioned with relation to the female member that when the former has advanced to the proper point in the latter to leave the desired interval between the inner end of the male die and the bottom of the female die the enlarged or bulged portion of the periphery of the male die must bite the projecting portion of the fabric with sufficient tightness to prevent the plastic material from flowing through the mouth of the female die, but not with sufficient force to cut said fabric. The thickened portion of the resulting article bears the major portion of the strain of wear in use, and by reason of the described reinforcement the device is made efficient and durable. The point at which the inturned lower flange connects with the side wall of the packing-ring is that of greatest strain when a packing-ring is in use, and by my improvement this portion of the ring is reinforced.

Various changes in the form, proportion, and the minor details of construction may be resorted to without departing from the spirit or sacrificing any of the advantages of this invention.

Having described my invention, what I claim is—

A die for compressing plastic material into a flexible base of fabric, to form pump packing-rings, said die comprising a female die member having a cylindrical wall, a flat bottom and a rounded corner between said wall and bottom, and a male die member having a downwardly-tapered side surface, which recedes downwardly from the cylindrical wall of the female member to said rounded corner thereof, a flat lower end, to occupy a position close to the bottom of the female member, and an outwardly bulged or swelled upper edge, to limit the insertion of the male member into the female member, and bite an overhanging portion of a base of fabric, projecting upwardly from the cavity of the female member, to prevent overflowing of the plastic material, substantially as specified.

In testimony that I claim the foregoing as my own I have hereto affixed my signature in the presence of two witnesses.

W. E. KARNS.

Witnesses:
   JOHN H. SIGGERS,
   HAROLD H. SIMMS.